March 16, 1943.  J. WAMPFLER  2,314,295
VEHICLE TRACTION DEVICE AND TIRE LUG
Filed June 21, 1941  2 Sheets-Sheet 1
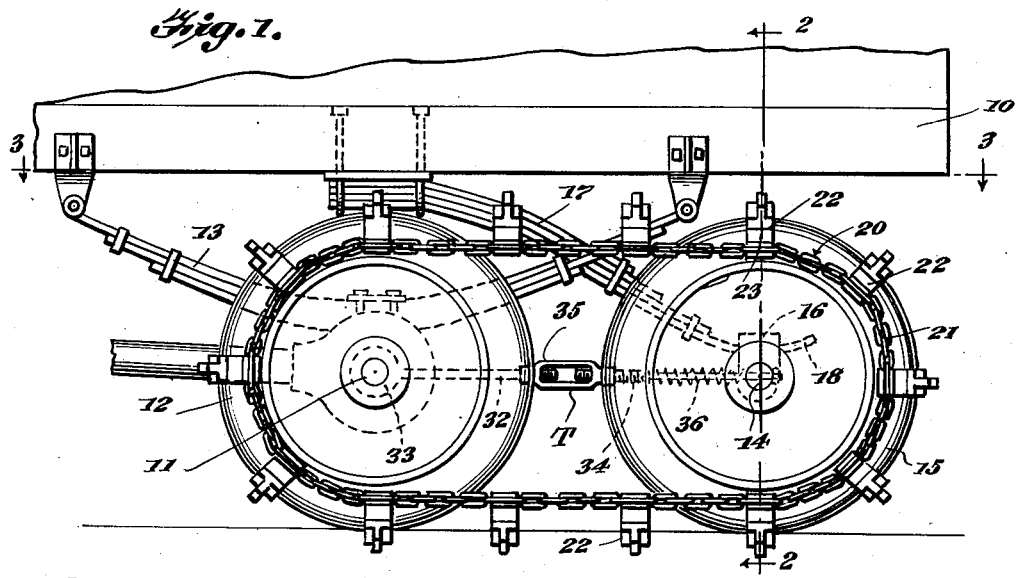
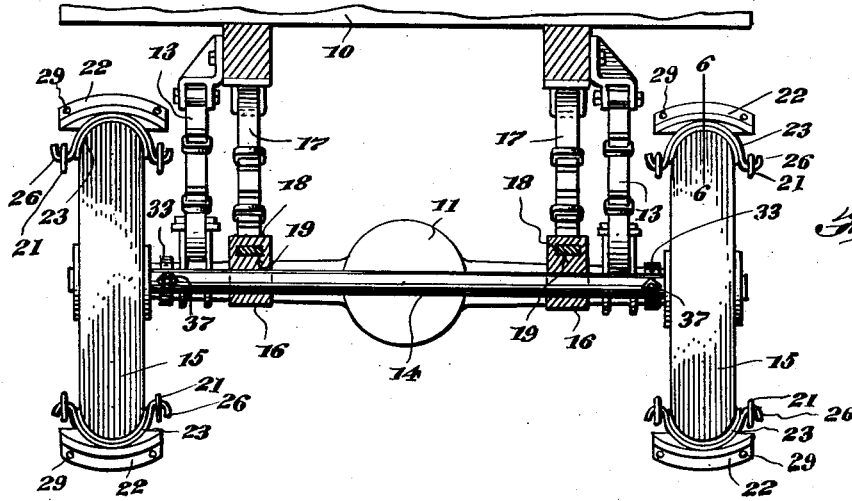
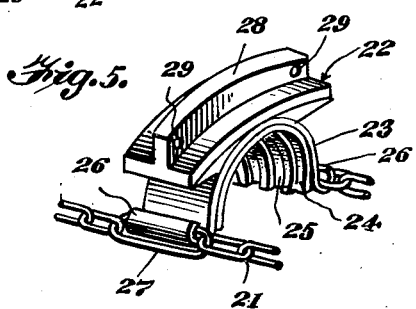
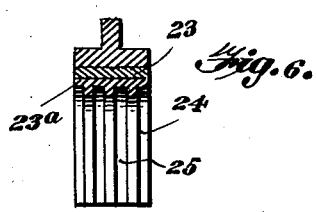
Inventor
JACOB WAMPFLER
By Irving H. McCathran
Attorney March 16, 1943.  J. WAMPFLER  2,314,295
VEHICLE TRACTION DEVICE AND TIRE LUG
Filed June 21, 1941  2 Sheets-Sheet 2
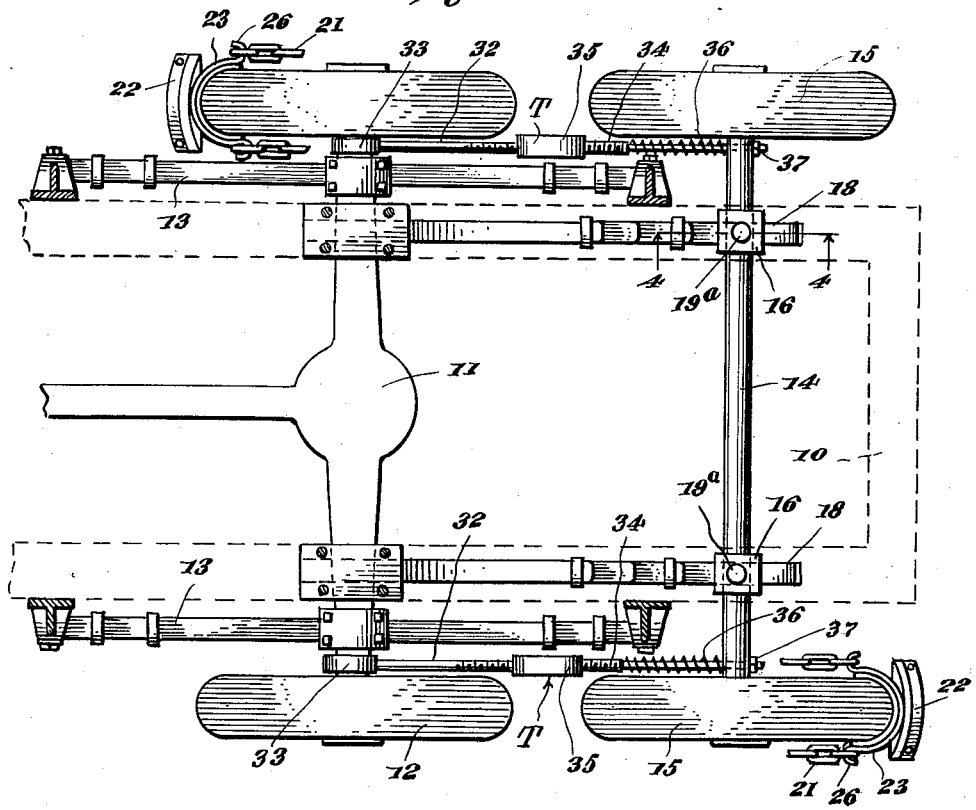
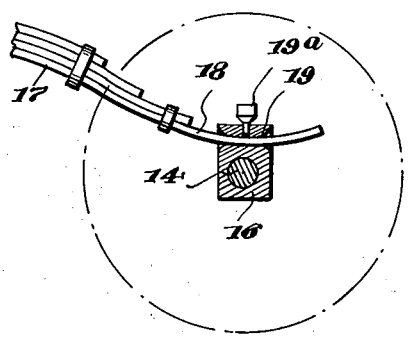
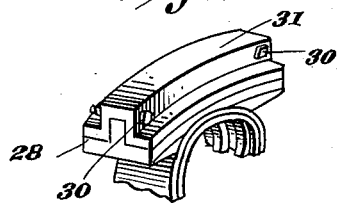
Inventor
JACOB WAMPFLER Patented Mar. 16, 1943

2,314,295

UNITED STATES PATENT OFFICE 2,314,295

VEHICLE TRACTION DEVICE AND TIRE LUG

Jacob Wampfler, Riegelsville, Pa.

Application June 21, 1941, Serial No. 399,189

2 Claims. (Cl. 305—9)

This invention relates to a vehicle traction device and tire lug, and has for one of its objects the production of a simple and efficient means to maintain a proper tension on the traction means so that the traction means will be securely held in a proper position upon the treads of the wheels of a truck or other vehicle.

A further object of this invention is the production of a simple and efficient spring connection for the auxiliary rear axle which supports the idler wheels of a vehicle.

Another object of this invention is the production of a simple and efficient traction lug for use with the traction device.

Other objects and advantages of the present invention will appear throughout the following specification and claims.

In the drawings:

Figure 1 is a side elevational view of the traction device;

Figure 2 is a vertical sectional view taken on line 2—2 of Figure 1;

Figure 3 is a horizontal sectional view taken on line 3—3 of Figure 1, the chain being broken away;

Figure 4 is a sectional view taken on line 4—4 of Figure 3;

Figure 5 is a perspective view of one of the lugs shown connected to the supporting chain;

Figure 6 is a transverse sectional view through one of the lugs;

Figure 7 is a fragmentary perspective view of one of the lugs showing a removable cleat secured thereto.

By referring to the drawings, it will be seen that 10 designates the body of a truck or other vehicle, which carries a driving axle 11 upon which are mounted a pair of driving wheels 12. The axle 11 carries the conventional springs 13 for the purpose of supporting the body 10.

An auxiliary rear axle 14 is carried in the rear of the axle 11, and this auxiliary rear axle 14 is supported by means of a pair of idler rear wheels 15, which wheels 15 freely rotate upon the axle 14. This axle 14 carries a pair of spring-engaging lugs 16 near the respective ends thereof, as shown in Figures 2 and 3, and adjacent the wheels 15.

A pair of auxiliary springs 17 are secured to the body 10 at a point above and in substantial alignment with the axle 10, and these auxiliary springs 17 are provided with lug-engaging ends 18, which ends 18 are upwardly curved and slidably mounted through the slots 19 formed in the lugs 16, as shown in Fig. 4. The springs 17 normally exert a downward pressure upon the axle 14 to hold the wheels 15 in contact with the ground. At the same time this connection of the spring 17 with the lugs 16 will permit proper sliding and rocking movement and proper yielding action to conform to the contour of the ground over which the vehicle may be passing.

The wheels 12 are trailed by the wheels 15, as shown, and a tractor element 20 extends over and around the front wheels 12 and rear wheels 15, a pair of which are located on opposite sides of the automobile, as shown. This tractor element 20 comprises a chain 21, which carries tractor lugs 22 at spaced intervals. Each tractor lug 22 comprises a tire-gripping portion 23, which tire-gripping portion is provided with a lining 23ª having circumferentially extending alternate ribs 24 and grooves 25 to provide an efficient tire-gripping surface for firmly gripping the treads of the tires of the wheels 12 and 15. This lining 23ª preferably formed of rubber or other similar material. The tire-gripping portion 23 is provided with outwardly rolled portions 26 for receiving links 27 of the chain 21 to connect the lugs 22 to the chain. Each lug 22 is provided with an inverted T-shaped cleat 28 at its outer tread portion and apertures 29 are provided at the ends of the cleats 28 for receiving bolts 30 to hold the auxiliary tread cleats 31 upon the cleats 28 in the manner shown in Figure 7.

In order that the chains 21 may be kept at a proper tension to hold the traction device upon the tires of the wheels 12 and 15, and prevent the chains from becoming displaced, I provide tightening means T. This tightening means T comprises a turn-buckle tightening element having a forward section 32 which is journaled at 33, near the end of the axle 11. A rear section 34 extends through the axle 14 near its end and the sections 32 and 34 are jointed by a turn-buckle connection 35. A coil spring 36 is carried by the section 34 and engages the axle 14 to provide a yieldable spreading action to force the axle 14 away from the axle 11. The nuts 37 limit the movement of the axle 14 away from the axle 11 and a proper adjustment is made by means of the turn-buckle 35. A similar tightening means is placed upon opposite sides of the vehicle adjacent the opposite ends of the axles 11 and 14, as shown in Figure 3.

From the foregoing description, it will be seen that a very simple and efficient means is provided for keeping the traction means under a proper tension by yieldably extending the axle 14 away from the axle 11, and at the same time the axle 14 is yieldably supported or suspended so as to yieldably hold the idler wheels 15 in contact with the surface of the road over which the vehicle is passing. The slidable connection of the lugs 16 with the springs 17 will also provide an efficient connection to facilitate free movement of the parts to allow the tractor element to follow the contour of the surface of the road over which the vehicle may be passing.

It should be understood that by removing a number of tractor lugs 22 from the chain 20, the chain may be moved around the wheels and when that portion of the chain having the tractor lugs removed passes over a portion of one of the wheels, the chain may sag or become slack, thereby facilitating the removal of the chain.

The lugs 28 may be increased in size by the addition of the auxiliary lug portions 31, as above described. By means of the present structure, the tractor element may be easily and conveniently moved when so desired, and the tension of the tractor element may be regulated or adjusted to produce efficient operation, or the removal or replacement when necessary. The slots 19 are so formed as to allow the ends 18 of the springs 17 to freely flex as will be obvious by considering Figure 4. A suitable grease cup 19ª may also be provided for lubricating the end 18 of the spring 17, if desired.

It should be understood that certain detail changes in the mechanical construction may be employed without departing from the spirit of the invention, so long as such changes fall within the scope of the appended claims.

Having described the invention, what is claimed as new is:

1. In combination with a vehicle having a driving axle and supporting driving wheels, an auxiliary axle located adjacent the driving axle, idler wheels carried by the auxiliary axle, a tractor element carried by the wheels and spanning the wheels, spring means carried by the vehicle, said spring means provided with an upwardly curved extension end, a lug carried by the auxiliary axle and having a guiding slot for receiving said upwardly curved extension end for yieldably holding the idler wheels in contact with the surface of the road over which the vehicle may be passing, the upwardly curved end providing a rocking and sliding action through the guiding slot as the spring means flexes.

2. In combination with a vehicle having a driving axle and supporting driving wheels, an auxiliary axle located adjacent the driving axle, idler wheels carried by the auxiliary axle, a tractor element carried by and spanning the wheels, spring means fixed at one end to the vehicle, a lug carried by the auxiliary axle and having a guiding slot formed therein, said spring means having a free upwardly curved end, said end being slidably mounted in said slot, said upwardly curved end producing a rocking and sliding action through the slot under the flexing of the spring.

JACOB WAMPFLER.